US011579746B2

(12) United States Patent
Cho et al.

(10) Patent No.: US 11,579,746 B2
(45) Date of Patent: Feb. 14, 2023

(54) DYNAMIC IMAGE CAPTURING APPARATUS AND METHOD USING ARBITRARY VIEWPOINT IMAGE GENERATION TECHNOLOGY

(71) Applicant: KOREA INSTITUTE OF SCIENCE AND TECHNOLOGY, Seoul (KR)

(72) Inventors: Junghyun Cho, Seoul (KR); Ig Jae Kim, Seoul (KR); Junyong Choi, Seoul (KR); Seok Yeong Lee, Seoul (KR)

(73) Assignee: KOREA INSTITUTE OF SCIENCE AND TECHNOLOGY, Seoul (KR)

(*) Notice: Subject to any disclaimer, the term of this patent is extended or adjusted under 35 U.S.C. 154(b) by 0 days.

(21) Appl. No.: 17/564,226

(22) Filed: Dec. 29, 2021

(65) Prior Publication Data
US 2022/0206668 A1    Jun. 30, 2022

(30) Foreign Application Priority Data
Dec. 31, 2020  (KR) .......................... 10-2020-0189382

(51) Int. Cl.
*G06F 3/04815*    (2022.01)
*G06T 15/20*    (2011.01)

(52) U.S. Cl.
CPC ........ *G06F 3/04815* (2013.01); *G06T 15/205* (2013.01)

(58) Field of Classification Search
CPC .............. G06F 3/04815; G06T 15/205; G06T 2207/30244; G06T 7/00; G06T 5/003; G06T 7/70; G06T 15/10; G06T 17/10; H04N 5/00; H04N 5/23222; H04N 5/23212; H04N 5/272; H04N 9/75
See application file for complete search history.

(56) References Cited

U.S. PATENT DOCUMENTS

| 7,555,158  | B2  |    | 6/2009  | Park et al. |
|------------|-----|----|---------|-------------|
| 9,918,006  | B2  | *  | 3/2018  | De Bayser .......... G10L 15/1822 |
| 10,129,461 | B2  | *  | 11/2018 | Adoni ..................... G06V 10/20 |
| 10,733,741 | B2  | *  | 8/2020  | Watanabe ............... G06T 5/003 |
| 10,937,235 | B2  | *  | 3/2021  | Dougherty ............. G06N 20/00 |
| 11,089,259 | B2  | *  | 8/2021  | Zhou .................... G11B 27/031 |

(Continued)

FOREIGN PATENT DOCUMENTS

| JP | 2008-304269 A | 12/2008 |
|----|---------------|---------|
| JP | 2014-219874 A | 11/2014 |

(Continued)

OTHER PUBLICATIONS

Korean Office Action for KR Application No. 10-2020-0189382 dated Dec. 15, 2022.

*Primary Examiner* — Vijay Shankar
(74) *Attorney, Agent, or Firm* — Cantor Colburn LLP

(57) ABSTRACT

Embodiments relate to a dynamic image capturing method and apparatus using an arbitrary viewpoint image generation technology, in which an image of background content displayed on a background content display unit or an image of background content implemented in a virtual space through a chroma key screen, having a view matching to a view of seeing a subject at a viewpoint of a camera is generated, and a final image including the image of the background content and a subject area is obtained.

22 Claims, 10 Drawing Sheets

(56) References Cited

U.S. PATENT DOCUMENTS

| | | | |
|---|---|---|---|
| 11,361,433 B2* | 6/2022 | Ando | A61B 6/504 |
| 2007/0122027 A1 | 5/2007 | Kunita et al. | |
| 2011/0149031 A1 | 6/2011 | Um et al. | |
| 2016/0088231 A1 | 3/2016 | Oku et al. | |
| 2020/0051304 A1 | 2/2020 | Choi et al. | |
| 2020/0351467 A1* | 11/2020 | Zhou | H04N 5/272 |
| 2022/0210350 A1* | 6/2022 | Chondro | G06T 5/003 |

FOREIGN PATENT DOCUMENTS

| | | |
|---|---|---|
| KR | 10-2006-0029140 A | 4/2006 |
| KR | 10-0588002 B1 | 6/2006 |
| KR | 10-0590025 B1 | 6/2006 |
| KR | 10-2009-0013019 A | 2/2009 |
| KR | 10-0960694 B1 | 6/2010 |
| KR | 10-2011-0071528 A | 6/2011 |
| KR | 10-2015-0103528 A | 9/2015 |
| KR | 10-2017-0111964 A | 10/2017 |
| KR | 10-2020-0017068 A | 2/2020 |

\* cited by examiner

FIG. 7
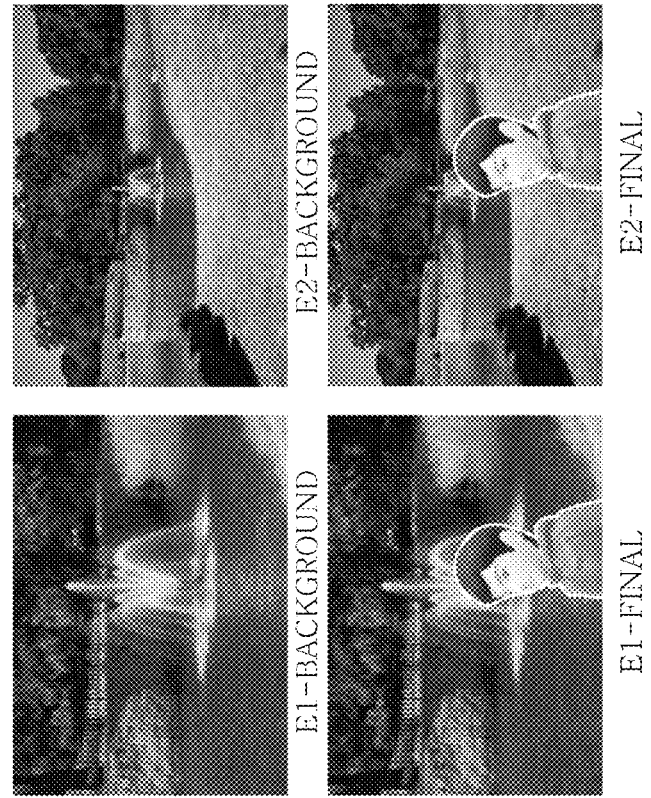
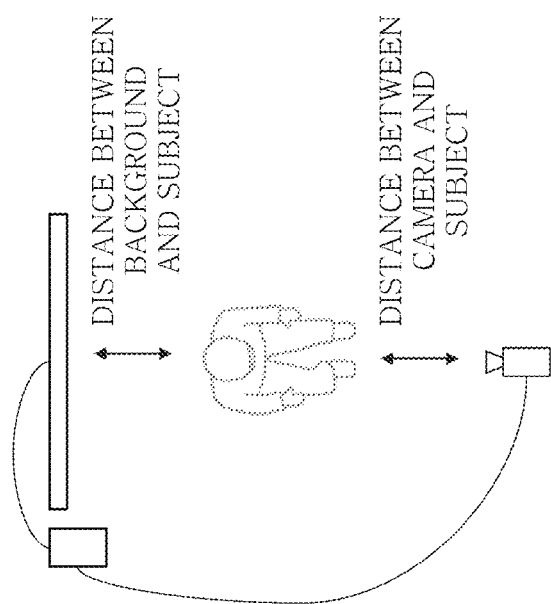

FIG. 8
F1-BACKGROUND
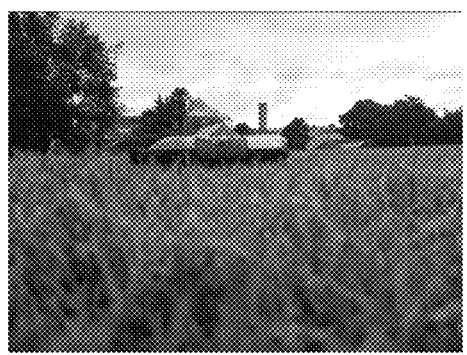
F2-BACKGROUND
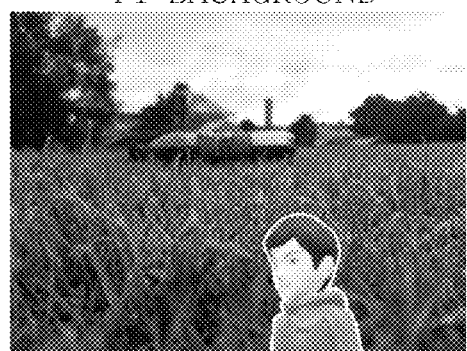
F1-FINAL
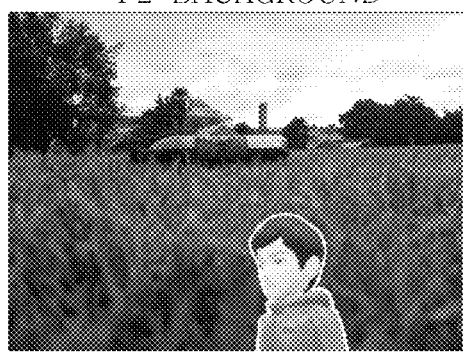
F2-FINAL

DYNAMIC IMAGE CAPTURING APPARATUS AND METHOD USING ARBITRARY VIEWPOINT IMAGE GENERATION TECHNOLOGY

CROSS-REFERENCE TO RELATED APPLICATION

This application claims priority to Korean Patent Application No. 10-2020-0189382, filed on Dec. 31, 2020, and all the benefits accruing therefrom under 35 U.S.C. § 119, the contents of which in its entirety are herein incorporated by reference.

BACKGROUND OF THE INVENTION

Description about National Research and Development Support

This study was supported by the Ministry of Science and ICT (Project Name: plenoptic-based hologram core technology development, Project No.: 1711117077) under the superintendence of the Institute for Information & Communications Technology Planning & Evaluation.

Field of the Invention

The present disclosure relates to an invention for dynamic image capturing using an arbitrary viewpoint image generation technology to provide a natural and realistic image as if a subject actually exists in a space of background content, based on a position and a pose of a camera.

Description of the Related Art

Innovations in technologies such as smartphones, virtual reality, augmented reality, and artificial intelligence have recently been rapidly applied to media production and consumer markets. Consumers have been able to selectively enjoy media content that suits their personal tastes, situations, and schedules, and producers have also been able to share their creations without time and space restrictions, Recently, due to Google's video service YouTube, one-person media markets have become active, and have been turning into profitable activities rather than simple hobby activities.

Also, the international pandemic situations such as COVID-19 in 2020 have accelerated the trend, video conferencing markets have also expanded rapidly, and the need for technology related to natural and realistic dynamic image capturing has become very important.

Referring to FIG. 1, in an existing embodiment, a chroma key image generation method may be used. A chroma key image generation technology involves capturing an image of a subject on a screen in a background of a single color, extracting the subject by removing the color, and synthesizing the extracted subject with a background image, so that the subject appears to exist in the background image. However, such an existing chroma key image generation technology has problems in that because a subject is simply shown with an image as a background, an immersive feeling as if the subject actually exists in a corresponding space may not be provided.

SUMMARY OF THE INVENTION

According to embodiments of the present disclosure, there may be provided a dynamic image capturing apparatus using an arbitrary viewpoint image generation technology to provide a natural and realistic image as if a subject actually exists in a space of background content.

A dynamic image capturing apparatus using an arbitrary viewpoint image generation technology according to an embodiment includes: an input unit configured to receive, from a camera, a captured image of a subject with a background content display unit as a background; and a controller configured to generate background content by considering a relationship between the camera and the subject, wherein the controller includes: a calculator configured to calculate a position and a pose of the camera by using the captured image of the subject, and calculate an image viewpoint of the background content based on the position and the pose of the camera; and a background generator configured to generate an image of the background content at the image viewpoint, wherein the image of the background content at the image viewpoint has a view matching to a view of seeing the background content at a viewpoint of the camera, wherein the image of the background content at the image viewpoint is displayed on the background content display unit, wherein the camera additionally captures an image of the subject with the image of the background content at the image viewpoint as a background.

A dynamic image capturing apparatus using an arbitrary viewpoint image generation technology according to an embodiment includes: an input unit configured to receive, from a camera, a captured image of a subject with a chroma key screen as a background; a controller configured to generate background content by considering a relationship between the camera and the subject; and a synthesizer configured to generate a final image by synthesizing a subject image obtained by separating an area of the subject from the captured image with an image of the generated background content, wherein the controller includes: a calculator configured to calculate a position and a pose of the camera by using the captured image of the subject, and calculate an image viewpoint of the background content based on the position and the pose of the camera; and a background generator configured to generate the image of the background content at the image viewpoint, wherein the image of the background content at the image viewpoint has a view matching to a view of seeing the background content at a viewpoint of the camera.

The calculator may be configured to calculate the position and the pose of the camera by using simultaneous localization and mapping (SLAM).

The background generator may be configured to, when the camera moves, in response to adjustment of a scale or a focus between the camera and the subject according to the movement of the camera, generate the image of the background content at the image viewpoint having a scale or a focusing between the subject and the background corresponding to the scale or the focusing between the camera and the subject.

The background generator may be configured to, when pre-stored background content is three-dimensional (3D) model, generate the image of the background content at the calculated image viewpoint by rendering with a view toward the background content at the calculated image viewpoint.

The synthesizer may be configured to synthesize the rendered, changed background content with the separated subject image.

The camera may be configured to obtain a 3D captured image based on at least one of focal plane information, depth information, and angle information, wherein the calculator is configured to calculate the position and the pose of the camera with respect to the subject based on the focal plane information, the depth information, and the angle information of the 3D captured image.

The controller may be further configured to blur or more dearly refocus the background content according to a users selection, in order to generate the image of the background content at the image viewpoint.

When the camera moves from a first viewpoint to a second viewpoint, the calculator may be configured to calculate an image viewpoint according to a movement trajectory of the camera, and the background generator may be configured to generate an image of the background content at the image viewpoint according to the movement trajectory.

The dynamic image capturing apparatus may further include a sensor configured to detect a movement of the camera, wherein the calculator is configured to calculate the position and the pose of the camera from a multi-viewpoint image input by using multi-viewpoint geometry.

A dynamic image capturing method using an arbitrary viewpoint image generation technology performed by a processor according to an embodiment includes: an input step of receiving, from a camera, a captured image of a subject with a background content display unit as a background; a control step of generating background content by considering a relationship between the camera and the subject, wherein the control step includes: a calculation step of calculating a position and a pose of the camera by using the captured image of the subject and calculating an image viewpoint of the background content based on the position and the pose of the camera; and a background generation step of generating an image of the background content at the image viewpoint, wherein the image of the background content at the image viewpoint has a view matching to a view of seeing the background content at a viewpoint of the camera, wherein the image of the background content at the image viewpoint is displayed on the background content display unit, wherein the camera additionally captures an image of the subject with the image of the background content at the image viewpoint as a background.

A dynamic image capturing method using an arbitrary viewpoint image generation technology performed by a processor according to an embodiment includes: an input step of receiving, from a camera, a captured image of a subject with a chroma key screen as a background; a control step of generating background content by considering a relationship between the camera and the subject; and a synthesis step of generating a final image by synthesizing a subject image obtained by separating an area of the subject from the captured image with an image of the generated background content, wherein the control step includes: a calculation step of calculating a position and a pose of the camera by using the captured image of the subject, and calculating an image viewpoint of the background content based on the position and the pose of the camera; and a background generation step of generating an image of the background content at the image viewpoint, wherein the image of the background content at the image viewpoint has a view matching to a view of seeing the background content at a viewpoint of the camera.

The calculation step may include calculating the position and the pose of the camera by using simultaneous localization and mapping (SLAM).

The background generation step may include, when the camera moves, in response to adjustment of a scale or a focus between the camera and the subject according to the movement of the camera, generating the image of the background content at the image viewpoint having a scale or a focusing between the subject and the background corresponding to the scale or the focusing between the camera and the subject.

The background generation step may include, when pre-stored background content is a three-dimensional (3D) model, generating the image of the background content at the calculated image viewpoint by rendering with a view toward the background content at the calculated image viewpoint.

The synthesis step may include synthesizing the rendered, changed background content with the separated subject image.

The camera may be configured to obtain a 3D captured image based on at least one of focal plane information, depth information, and angle information, wherein the calculation step includes calculating the position and the pose of the camera with respect to the subject based on the focal plane information, the depth information, and the angle information of the 3D captured image.

The control step may include blurring or more clearly refocusing the background content according to a user's selection, in order to generate the image of the background content at the image viewpoint.

When the camera moves from a first viewpoint to a second viewpoint, the calculation step may include calculating an image viewpoint according to a movement trajectory of the camera, and the background generation step may include generating an image of the background content at the image viewpoint according to the movement trajectory.

A sensor configured to detect a movement of the camera may be further included, wherein the calculation step includes calculating the position and the pose of the camera from a multi-viewpoint image input by using multi-viewpoint geometry.

A dynamic image capturing apparatus using an arbitrary viewpoint image generation technology according to an aspect of the present disclosure may calculate a position and a pose of a camera by considering a relationship between the camera and a subject, may calculate an image viewpoint of background content based on the calculated position and pose of the camera, and may generate an image of the background content at the image viewpoint, to provide a realistic indirect experience and maximize an immersive feeling.

Also, when the camera moves, in response to the adjustment of a scale or a focus between the camera and the subject according to the movement of the camera, the dynamic image capturing apparatus may generate the image of the background content at the image viewpoint having a scale or a focusing between the subject and a background corresponding to the scale or the focusing between the camera and the subject, so that the subject appears to actually exist in a background content image, The effects of the present disclosure are not limited to the above-mentioned effects, and other effects not mentioned herein will be clearly understood by one of ordinary skill in the art from the appended claims.

BRIEF DESCRIPTION OF THE DRAWINGS

The following is a brief introduction to necessary drawings in the description of the embodiments to describe the technical solutions of the embodiments of the present disclosure or the existing technology more clearly. It should be understood that the accompanying drawings are for the purpose of describing the embodiments of the present disclosure and are not intended to be limiting of the present disclosure. Additionally, for clarity of explanation, some elements in the accompanying drawings may be depicted in variously changed forms such as exaggeration and omission.

FIG. 7 is a view illustrating that, when a camera moves, in response to the adjustment of a scale between the camera and a subject, a background generator generates an image of background content at an image viewpoint having a scale between the subject and a background corresponding to the scale between the camera and the subject, according to an embodiment of the present disclosure.

FIG. 8 is a view illustrating a process of blurring or more clearly refocusing background content according to a user's selection, according to an embodiment of the present disclosure.

DETAILED DESCRIPTION OF THE PREFERRED EMBODIMENTS

The terminology used herein is for the purpose of describing particular embodiments only and is not intended to be limiting of the present disclosure. Unless expressly stated to the contrary, the singular forms as used herein include the plural forms as well. The term "comprises" used herein specifies the presence of stated features, regions, integers, steps, operations, items, and/or components, but does not preclude the presence or addition of one or more other features, regions, integers, steps, operations, items, and/or components.

Unless otherwise defined, all terms including technical and scientific terms used herein have the same meaning as commonly understood by one of ordinary skill in the art. It will be further understood that terms, such as those defined in commonly used dictionaries, should be interpreted as having a meaning that is consistent with their meaning in the context of the relevant art document and the present disclosure, and will not be interpreted in an idealized or overly formal sense unless expressly so defined herein.

Hereinafter, embodiments of the present disclosure will be described in detail with reference to the accompanying drawings.

A dynamic image capturing apparatus according to embodiments may generate, even when a camera has an arbitrary viewpoint, an image having a view of actually seeing a subject and a background at the arbitrary viewpoint, and even when the camera moves, may provide a dynamic image having a view at a viewpoint according to the movement.

In the specification, background content that is two-dimensional (2D) or three-dimensional (3D) image content used as a background of a subject may be implemented as an image model in a 2D or 3D space. For example, referring to FIG. 7 described below, the background content may include a 3D house model and a surrounding background model. As such, because background content is a 2D or 3D image model, the terms "background content" and "model" may be interchangeably used when necessary.

The dynamic image capturing apparatus supplies an image of background content by using a blue or green chroma key screen or by using a display apparatus for displaying an image.

As such, the dynamic image capturing apparatus using the arbitrary viewpoint image generation technology according to embodiments of the present disclosure may have various background supply configurations for the purpose of generating a dynamic image.

Hereinafter, for clarity of explanation, among embodiments using a display apparatus will be referred to as Embodiment 1 and will be described below in more detail with reference to FIGS. 2 through 4, and embodiments using a chroma key screen will be referred to as Embodiment 2 and will be described below in more detail with reference to FIGS. 9 and 10.

Embodiment 1

Figure 1:
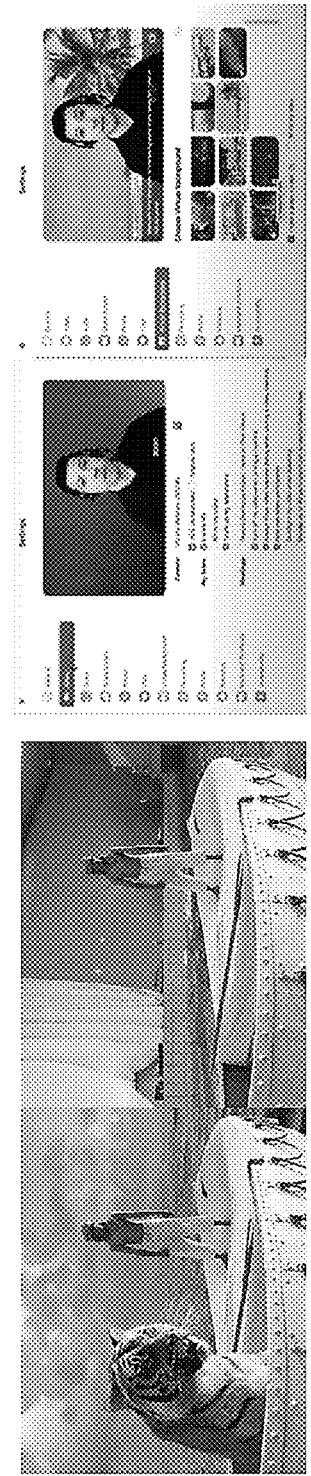
FIG. 1 illustrates a synthesis result of a subject and background content through a conventional image generation method using a chroma key method.
Figure 2:
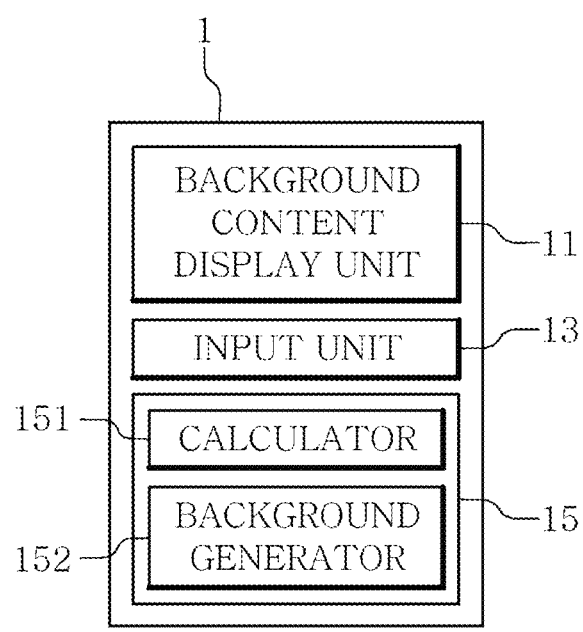
FIG. 2 is a diagram illustrating a dynamic image capturing apparatus using an arbitrary viewpoint image generation technology when a captured image has a background content display unit as a background, according to an embodiment of the present disclosure.
Figure 3:
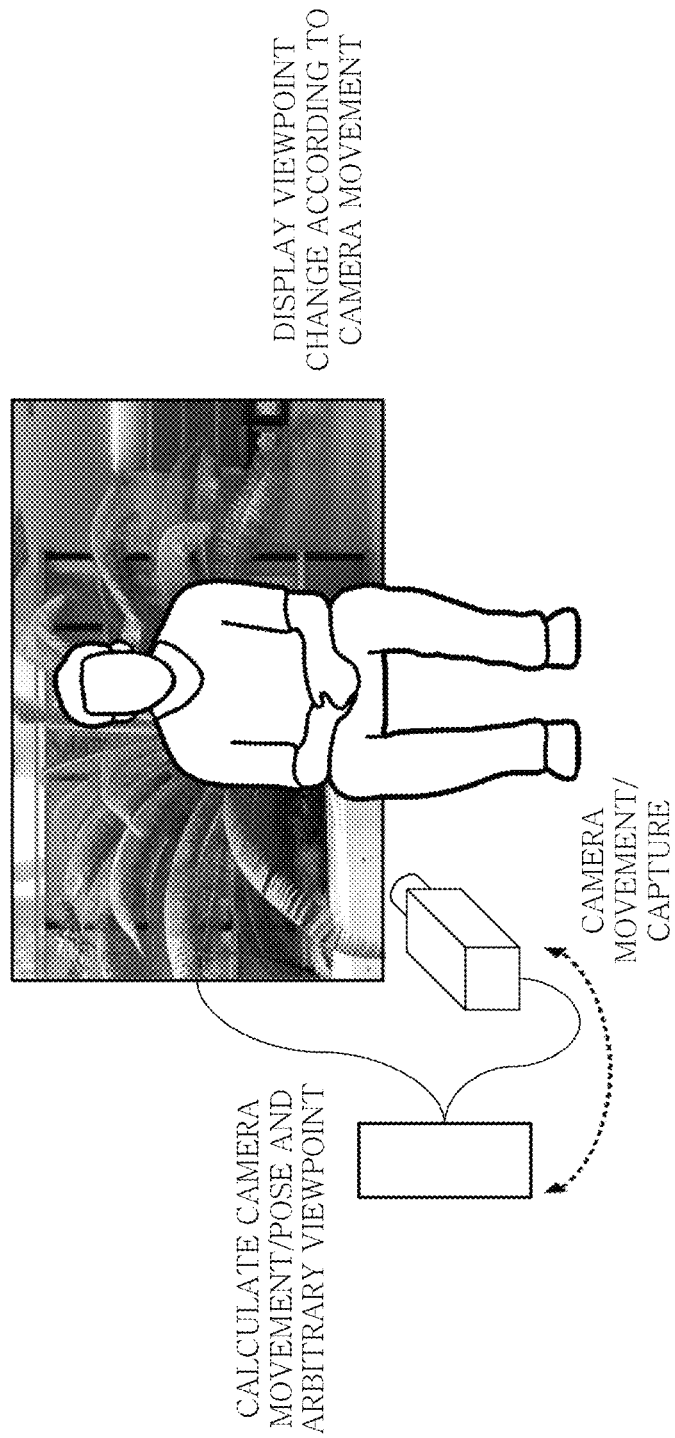
FIG. 3 is a conceptual view illustrating a dynamic image capturing apparatus using an arbitrary viewpoint image generation technology, according to an embodiment of the present disclosure.

FIG. 2 is a diagram illustrating a dynamic image capturing apparatus using an arbitrary viewpoint image generation technology when a captured image has a background content display unit as a background, according to an embodiment of the present disclosure, FIG. 3 is a conceptual view illustrating a dynamic image capturing apparatus using an arbitrary viewpoint image generation technology, according to an embodiment of the present disclosure.

In the specification, an image of background content refers to an image having a view of seeing a model implemented in a two-dimensional (2D) or three-dimensional (3D) space at a specific viewpoint. When the specific viewpoint is one or more arbitrary viewpoints, a plurality of images having different views for the same background content may be obtained.

Referring to FIG. 2, a dynamic image capturing apparatus using an arbitrary viewpoint image generation technology (hereinafter, referred to as "dynamic image capturing apparatus") 1 may include a background content display unit 11, an input unit 13, a controller 15, and a calculator 151 and a background generator 152 in the controller 15.

The background content display unit 11 includes a display apparatus. When the background content display unit 11 is a display apparatus, the background content display unit 11 may be a flat or dome-shaped display apparatus. In an embodiment, a one-person media content creator may use a flat display and a studio-sized content creator may use a dome-shaped display, but the present disclosure is not limited thereto.

The background content display unit 11 displays an image having a view corresponding to a viewpoint of a camera and causes the camera to capture a captured image having the image as a background of a subject, as described below.

The input unit 13 receives the captured image of the subject from the camera with the background content display unit 11 as a background. The camera may be a single camera or multiple cameras.

In an embodiment, the camera may be configured to obtain a 3D captured image based on at least one of focal plane information, depth information, and angle information. For example, the camera may be, but is not limited to, a plenoptic camera having a focus recombination function. Plenoptic technology is a technology of two-dimensionally or three-dimensionally visualizing a multi-viewpoint plenoptic image, calculating shape information, and forming a shape. The plenoptic camera provides a user with functions such as re-focusing of capturing an image once and changing a focal plane and view variation of allowing a scene to be viewed from various angles. Depth information, viewpoint change, and focus change may be performed, through a sensor for storing all directions of the plenoptic technology. The input unit 13 is configured to receive a 3D multi-viewpoint captured image based on 2D focal plane information, depth information, and angle information through the plenoptic camera.

This camera may capture an image of a subject having a display screen of the background content display unit 11 as a background, and may obtain a captured image including an image of the subject and an image of background content, as shown in FIG. 3.

In an embodiment, the controller 15 generates the background content by considering a relationship between the camera and the subject. Also, the controller 15 may move the camera. For example, the controller 15 may control the camera to move by controlling an arm on which the camera is installed, or may control a support supporting the camera to move only an orientation from a fixed position.

Accordingly, the dynamic image capturing apparatus 1 may obtain a natural dynamic image, and the controller 15 may include the calculator 151 and the background generator 152.

The controller 15 may include a central processing unit (CPU) and a memory, and may be implemented as a server connectable to another terminal through a communication network. However, the present disclosure is not limited to the CPU and the memory. Also, the processing unit according to the present disclosure may be physically implemented as one device and may be distributed in a plurality of devices, and thus the present disclosure is not limited to configurations of such physical devices.

The controller 15 may execute or produce various software based on an operating system (OS), that is, a system. The OS is a system program for allowing software to use hardware of a device, and examples of the OS may include mobile computer OSs such as Android OS, iOS, Windows Mobile OS, Bada OS, Symbian OS, and Blackberry OS, and computer OSs such as Windows series, Linux series, Unix series, MAC, AIX, and HP-UX.

In an embodiment, the calculator 151 calculates a position and a pose of a camera by using the captured image of the subject, and calculates an image viewpoint of the background content based on the position and the pose of the camera.

In an embodiment, the calculator 151 may align the position and the pose of the camera by using sensor information (e.g., an inertial measurement unit (IMU) sensor) of the camera. The background generator 152 may change the background content based on the position and the pose of the camera calculated by the calculator 151 by using the sensor information of the calculator.

In an embodiment, the dynamic image capturing apparatus 1 may further include a sensor (not shown) for detecting a movement of the camera. Then, the calculator 151 may calculate the position and the pose of the camera from a multi-viewpoint image input by using multi-viewpoint geometry. The input multi-viewpoint image may be a monoscopic image or a multi-scopic image. A monoscopic image is an image captured with one camera moving around a subject, and a multi-scopic image is an image captured with a plurality of cameras around a subject. For example, a static subject may be a monoscopic image, and a dynamic subject may be a multi-scopic image. In addition, the input multi-viewpoint image may be converted into a form suitable for a stereoscopic image, and camera specifications such as an angle of view may be identified.

In an embodiment, the calculator 151 may calculate the position and the pose of the camera by using simultaneous localization and mapping (SLAM). In this case, the position of the camera is a relative position with respect to a position of the camera first obtained by the calculator 151, and may be determined through a distance and a direction in which the camera is held and moved.

In an embodiment, when the input unit 13 obtains a 3D captured image based on at least one of focal plane information, depth information, and angle information from the plenoptic camera, the calculator 151 may calculate the positon and the pose of the camera with respect to the subject based on the focal plane information, the depth information, and the angle information of the 3D captured image.

The background generator 152 generates an image of the background content at the image viewpoint calculated by the calculator 151. The image of the background content at the image viewpoint has a view matching to a view of seeing the background content at a viewpoint of a camera.

In an embodiment, when the camera moves, in response to the adjustment of a scale or a focus between the camera and the subject, the background generator 152 may generate the image of the background content at the image viewpoint having a scale or a focusing between the subject and the background corresponding to the scale or the focusing between the camera and the subject. As the camera moves, the scale of the subject seen by the camera, that is, the scale between the subject and the background, is adjusted based on a focal length (FOV) of the camera, a distance between the camera and the subject, and/or the scale between the camera and the subject, and the focus between the subject and the background is adjusted to match to the focus between the subject and the camera.

In an embodiment, when pre-stored background content is a 3D model, the background generator 152 may generate the image of the background content at the calculated image viewpoint by rendering with a view toward the background content from the calculated image viewpoint.

In an embodiment, when pre-stored background content is a 3D model, in a background generation step S152, the image of the background content at the calculated image viewpoint may be generated by rendering with a view toward the background content from the calculated image viewpoint.

In an embodiment, a control step S15 may further include blurring or more clearly refocusing the background content according to the users selection, to generate the image of the background content at the image viewpoint.

In an embodiment, the controller 15 may be further configured to blur or more dearly refocus the background content according to the users selection, to generate the image of the background content at the image viewpoint.

Once the image of the background content at the image viewpoint is generated by the background generator 152, the image of the background content at the image viewpoint is displayed on the background content display unit 11, and the camera additionally captures an image of the subject with the image of the background content at the image viewpoint as a background. The dynamic image capturing apparatus 1 may be further configured to: display the additionally captured image on a display unit other than the background content display unit 11 or to transmit the additionally captured image to an external device through electrical communication.

In the dynamic image capturing apparatus 1 constructed as described above, as shown in FIG. 3, when an image viewpoint changes according to a movement of a camera, the calculators 151, 251 calculate a position and a pose of the camera and calculate an image viewpoint of background content based on the position and the pose of the camera, and the background generators 152, 252 generate an image of the background content at the image viewpoint. A process by which the dynamic image capturing apparatus 1 obtains a dynamic image will be described in more detail with reference to FIG. 4.

Figure 4:
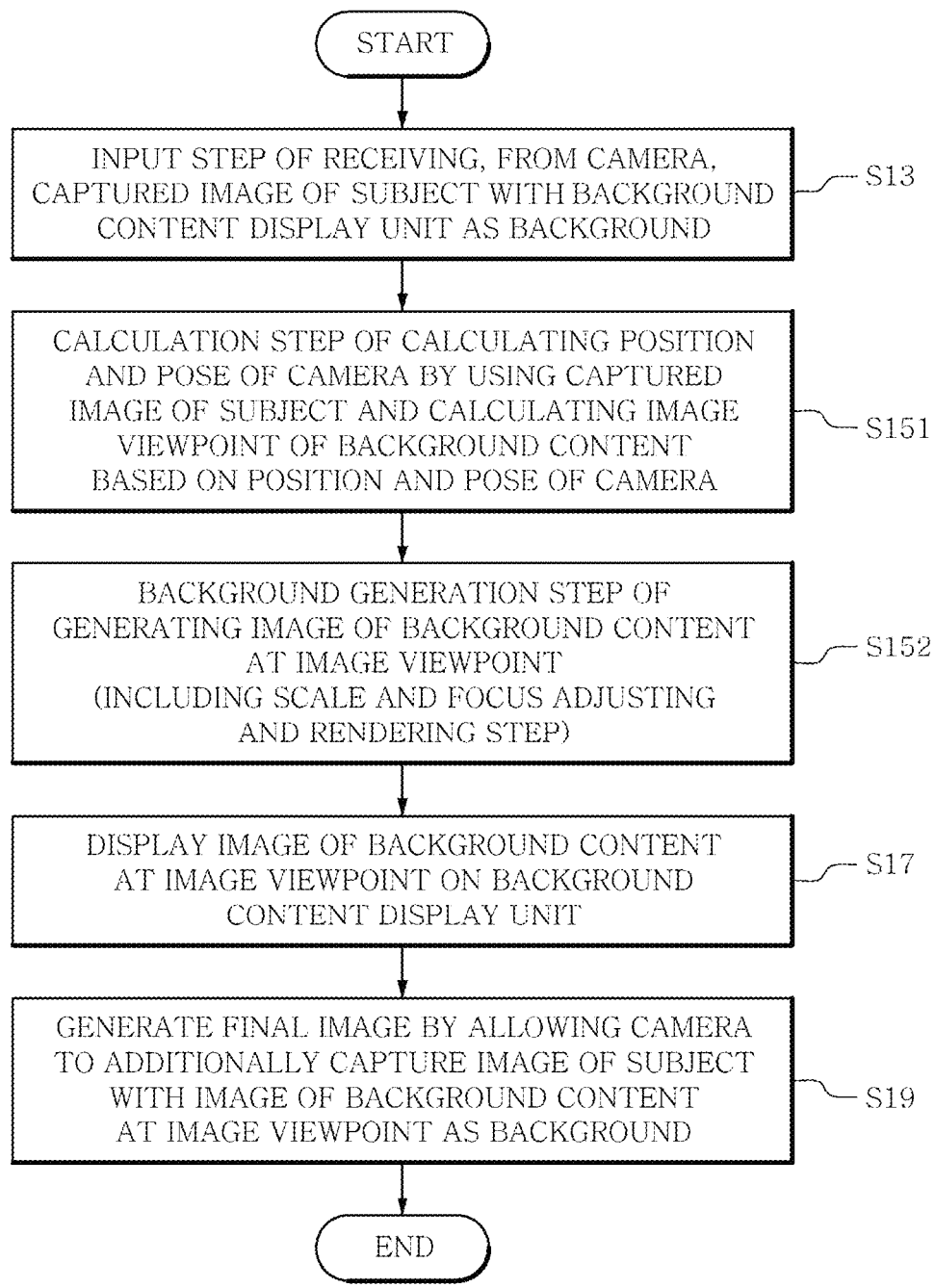
FIG. 4 is a flowchart illustrating dynamic image capturing method using an arbitrary viewpoint image generation technology when a captured image has a background content display unit as a background, according to an embodiment of the present disclosure.

FIG. 4 is a flowchart illustrating a dynamic image capturing method using an arbitrary viewpoint image generation technology when a captured image has a background content display unit as a background, according to an embodiment of the present disclosure.

The dynamic image capturing method using the arbitrary viewpoint image generation technology of FIG. 4 (hereinafter, referred to as "dynamic image capturing method") is performed by a computing device including a processor. The computing device including the processor may performed by, for example, the dynamic image capturing apparatus 1 or some elements (e.g., the input unit 13, the controller 15, and the calculator 151 and/or the background generator 152 of the controller), or may be performed by another computing device. Hereinafter, for clarity of explanation, the present disclosure will be described in more detail with embodiments in which the dynamic image capturing method is performed by the dynamic image capturing apparatus 1.

Referring to FIG. 4, the dynamic image capturing method includes a step S13 of receiving, from a camera, a captured image of a subject having the background content display unit 11 as a background (e.g., by using the input unit 13). The camera may be a single camera or multiple cameras.

In an embodiment, the camera is configured to obtain a 3D captured image based on at least one of focal plane information, depth information, and angle information. For example, the camera may be, but is not limited to, a plenoptic camera having a focus recombination function. Depth information, viewpoint change, and focus change may be performed, through a sensor for storing all directions of the plenoptic technology. The input step S13 includes receiving a 3D multi-viewpoint captured image based on 2D focal plane information, depth information, and angle information through the plenoptic camera.

Also, the dynamic image capturing method includes a step S15 of generating background content by considering a relationship between the camera and the subject (e.g., by using the controller 15).

In an embodiment, the control step S15 may include a step S151 of calculating a position and a pose of the camera by using the captured image of the subject and calculating an image viewpoint of the background content based on the position and the pose of the camera (e.g., by using the calculator 151), and a step S152 of generating an image of the background content at the image viewpoint (e.g., by using the background generator 152).

In an embodiment, in the calculation step S151, the position and the pose of the camera is calculated by using the captured image of the subject and the image viewpoint of the background content is calculated based on the position and the pose of the camera.

In an embodiment, in the calculation step S151, the position and the pose of the camera may be aligned by using sensor information of the camera (e.g., an IMU sensor). In the background generation step S152, the background content may be changed based on the position and the pose of the camera calculated in the calculation step by using the sensor information of the calculation step.

In an embodiment, when a sensor for detecting a movement of the camera is used, in the calculation step S151, the position and the pose of the camera may be calculated from a multi-viewpoint image input by using multi-viewpoint geometry. The input multi-viewpoint image may be a monoscopic image or a multi-scopic image. A monoscopic image is an image captured with one camera moving around a subject, and a multi-scopic image is an image captured with a plurality of cameras around a subject. For example, a static subject may be a monoscopic image, and a dynamic subject may be a multi-scopic image. In addition, the input multi-viewpoint image may be converted into a form suitable for a stereoscopic image, and camera specifications such as an angle of view may be identified.

In an embodiment, in the calculation stop S151, the position and the pose of the camera may be calculated by using simultaneous localization and mapping (SLAM). In this case, the position of the camera is a relative position with respect to a position of the camera first obtained in the calculation step S151, and may be determined through a distance and a direction in which the camera is held and moved.

In an embodiment, when a 3D captured image is obtained based on at least one of focal plane information, depth information, and angle information from the plenoptic camera by the input step S13, in the calculation step S151, the position and the pose of the camera with respect to the subject may be calculated based on the focal plane information, the depth information, and the angle information of the 3D captured image.

In the background generation step S152, the image of the background content at the image viewpoint calculated in the calculation step S151 is generated. The image of the background content at the image viewpoint has a view matching to a view of seeing the background content at a viewpoint of the camera.

In an embodiment, when the camera moves, in response to the adjustment of a scale or a focus between the camera and the subject, in the background generation step S152, the image of the background content at the image viewpoint having a scale or a focusing between the subject and the background corresponding to the scale or the focusing between the camera and the subject is generated. As the camera moves, the scale of the subject seen by the camera, that is, the scale between the subject and the background, is adjusted based on a focal length (FOV) of the camera, a distance between the camera and the subject, and/or the scale between the camera and the subject, and the focus between the subject and the background is adjusted to match to the focus between the subject and the camera.

Also, the dynamic image capturing method includes a step S17 of displaying the image of the background content at the image viewpoint of the step S151, generated in the step S152, on the background content display unit 11 and a step S19 of obtaining a final image by capturing an image of the subject with the image of the background content at the image viewpoint of the step S151, generated in the step S152 by the camera, as a background.

Figure 5:
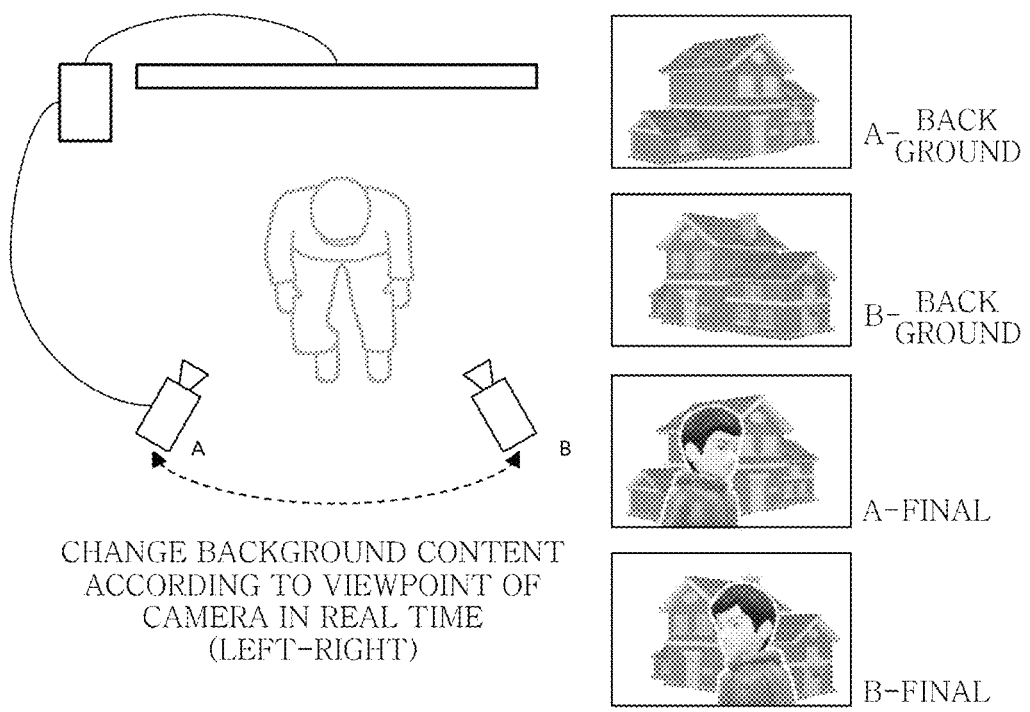
FIG. 5 is a view illustrating an image of background content seen from a viewpoint of a camera, which is generated when a viewpoint of the camera changes in a left-right direction, according to an embodiment of the present disclosure.
Figure 6:
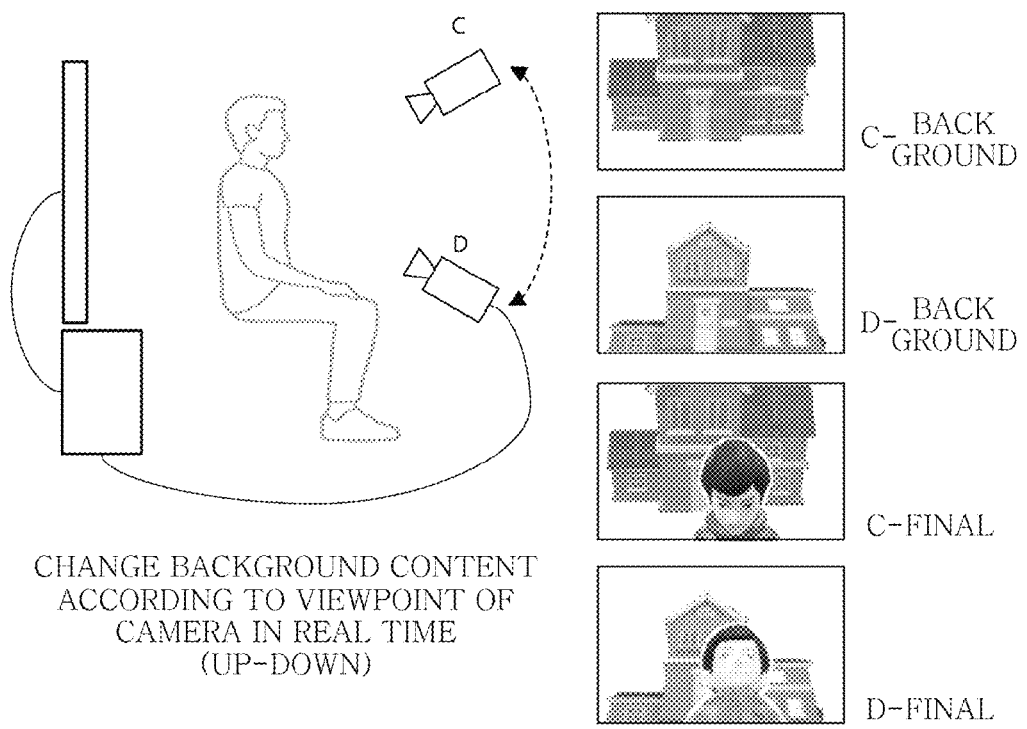
FIG. 6 is a view illustrating an image of background content seen from a viewpoint of a camera, which is generated when a viewpoint of the camera changes in an up-down direction, according to an embodiment of the present disclosure.

FIGS. 5 and 6 are views illustrating that, when a camera moves from a first viewpoint to a second viewpoint, the calculators 151, 251 calculate an image viewpoint according to a movement trajectory of the camera, and the background generators 152, 252 generate an image of background content at the image viewpoint according to the movement trajectory, according to an embodiment.

In FIG. 5, an image of background content seen from a viewpoint of the camera, which is generated when the viewpoint of the camera changes in a left-right direction, and a result using the image of the background content are illustrated.

In FIG. 6, an image of background content seen from a viewpoint of the camera, which is generated when the viewpoint of the camera changes in an up-down direction, and a result using the image of the background content are illustrated.

In FIGS. 5 and 6, a viewpoint of the camera changes without changing a distance between a subject and the camera and a distance between the camera and the background content display unit 11.

Because the camera and the subject are located in the same real space, when the camera has a viewpoint A, a shape of the subject seen from the viewpoint A is captured as an image in a frame captured by the camera at the viewpoint A.

In contrast, because the camera is located in a real space and background content (e.g., a house of FIG. 5) is located in a virtual space, the camera and the background content are located in different spaces. However, because an image of the background content seen from the viewpoint A is generated and displayed on the background content display unit 11 in the step S152, a shape of the background content seen from the viewpoint A is captured as an image in a frame captured by the camera. As a result, a final image A of FIG. 5 is obtained (S19).

Also, when the camera has a viewpoint B, an image of the subject seen from the viewpoint B is naturally captured as an image in a frame captured by the camera at the viewpoint B. Also, because an image of the background content seen from the viewpoint B is generated and displayed on the background content display unit 11 in the step S152, a final image B of FIG. 5 is obtained (S19).

Like in FIG. 5, as shown in FIG. 6, even when the camera has a different viewpoint C or D, a final image C or D having a view of seeing the subject and the background content at the viewpoint is obtained (S19).

In an embodiment, when the camera moves from a first viewpoint to a second viewpoint, the background generation step S152 may include generating an image of the background content corresponding to a change of the pre-stored background content from the first viewpoint to the second viewpoint.

As shown in FIG. 5, when the camera moves from the viewpoint A to the viewpoint B, the background generator 152 may generate a plurality of frames having views of seeing the background content at a plurality of viewpoints on a movement trajectory. The frame is used as an image of the background content according to an image viewpoint according to the movement trajectory. Then, when the camera captures an image of the subject with each individual frame as a background, a plurality of still images or moving images in which a viewpoint from which the camera sees the subject and a viewpoint from which the camera sees the background content match to each other are captured.

Also, like in FIG. 5, as shown in FIG. 6, when the camera moves from the viewpoint C to the viewpoint D, the background generator 152 generates an image of the background content at an image viewpoint according to a movement trajectory, that is, an up/down trajectory.

Then, a plurality of frames according to the movement trajectory are sequentially displayed on the background content display unit 11, and a display speed of the frames corresponds to a movement time of the camera. Accordingly, a pose change of the subject with respect to the camera and a pose change of the background content with respect to the camera are synchronized with each other. As a result, a dynamic image having a view in which the pose change of the subject and the pose change of the background content according to the movement of the camera are naturally harmonized may be captured (S19).

FIG. 7 is a view illustrating that, when a camera moves, in response to the adjustment of a scale between the camera and a subject, a background generator generates an image of background content at an image viewpoint having a scale between the subject and a background corresponding to the scale between the camera and the subject, according to an embodiment of the present disclosure.

In FIG. 7, a distance between the subject and the camera and/or a distance between the camera and the background content display unit 11 changes.

As shown in FIG. 7, when the camera moves, in response to the adjustment of a scale or a focus between the camera and the subject, the background generators 152, 252 may generate an image of background content at an image viewpoint having a scale or a focusing between the subject and a background corresponding to the scale or the focusing between the camera and the subject.

As the camera moves, the scale of the subject seen by the camera, that is, the scale between the subject and the background, is adjusted based on a focal length (FOV) of the camera, a distance between the camera and the subject, and/or the scale between the camera and the subject, and the focus between the subject and the background is adjusted to match to the focus between the subject and the camera.

When the camera moves closer to the subject and thus the scale of the subject with respect to the camera increases, in response to the increase in the scale, an image E1-Background of background content at an image viewpoint having a scale between the subject and a background corresponding to the scale between the camera and the subject may be generated. That is, the image of the background content is set to a scale between the camera and the subject before the camera moves closer, but when the camera moves closer, is changed to a new scale corresponding to the changed scale between the camera and the subject.

Then, the camera may obtain a final image E1-Final by additionally capturing an image of the subject in the image of the background content having the new scale (S19).

Likewise, when the camera moves farther away from the subject and thus the scale of the subject with respect to the camera decreases, in response to the decrease in the scale, an image E2-Background of the background content at an image viewpoint having a scale between the subject and a background corresponding to the scale between the subject and the camera may be generated. A final image E2-Final is obtained by additionally capturing the image of the subject with the generated image E2-Background of the background content (S19).

FIG. 8 is a view illustrating a process of blurring or more clearly refocusing background content according to a user's selection, according to an embodiment of the present disclosure.

Referring to FIG. 8, in the step S152, an image of background content that is blurred may be generated. Then, a camera may obtain a final image F1-Final by additionally capturing an image of a subject in the background content F1-Background that is blurred in the step S152 (S19).

Also, an image of the background content that is refocused may be generated in the step S152. Then, the camera may obtain a final image F2-Final by additionally capturing an image of the subject in the background content F2-Background that is refocused in the step S152.

In an embodiment, the dynamic image capturing apparatus 1 may further include an output unit configured to output a final image generated by the synthesizer. The output unit is an output device different from the background content display unit. In another embodiment, the dynamic image capturing apparatus 1 may be further configured to transmit a final image to another external device through electric communication.

Then, the dynamic image capturing apparatus 1 may provide a final image at an arbitrary viewpoint of the camera obtained in the step S19 to the user through the output unit.

Embodiment 2

Figure 9:
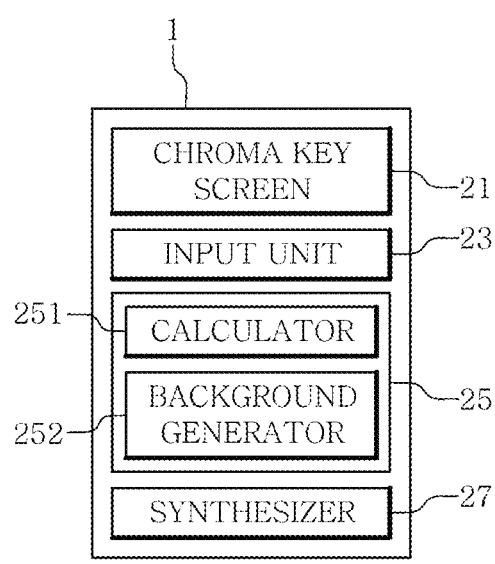
FIG. 9 is a diagram illustrating a dynamic image capturing apparatus using an arbitrary viewpoint image generation technology when a captured image has a chroma key screen as a background, according to another embodiment of the present disclosure.

FIG. 9 is a diagram illustrating a dynamic image capturing apparatus using an arbitrary viewpoint image generation technology when a captured image has a chroma key screen as a background, according to another embodiment of the present disclosure.

Referring to FIG. 9, the dynamic image capturing apparatus 1 may include a chroma key screen 21, an input unit 23, a controller 25, and a calculator 251 and a background generator 252 in the controller, and a synthesizer 27.

The elements 21, 23, 25, 251, and 252 of FIG. 9 are corresponding elements having the same functions as the elements 11, 13, 15, 151, and 152 of FIG. 2. Accordingly, Embodiment 2 shares some technical features with Embodiment 1, and thus a difference will be mainly described.

When compared to the controller 15 of Embodiment 1, the controller 25 may extract a background chroma back in a captured image received from the input unit 23, and may extract a subject image by removing the background chroma back. An image captured in a studio is received from a camera, and a subject image from which a background chroma back that is a blue screen is removed is extracted. In this case, one of a red screen, a green screen, and a blue screen is used as the background chroma back, and the blue screen is mainly used as the background chroma back. Next, the controller 25 may convert a pixel corresponding to the determined color of the background chroma back into a transparent pixel, and may generate an image in which only a subject is visible and a background part includes background content.

The synthesizer 27 generates a final image by synthesizing the subject image obtained by separating the subject area from the captured image with the generated image of the background content.

In an embodiment, when pre-stored background is a 3D model, by rendering with a view toward the background at an image viewpoint calculated by the calculator 251, an image of the background content at the calculated image viewpoint may be generated. In this case, the synthesizer 27 may synthesize the rendered, changed background content with the separated subject image.

Figure 10:
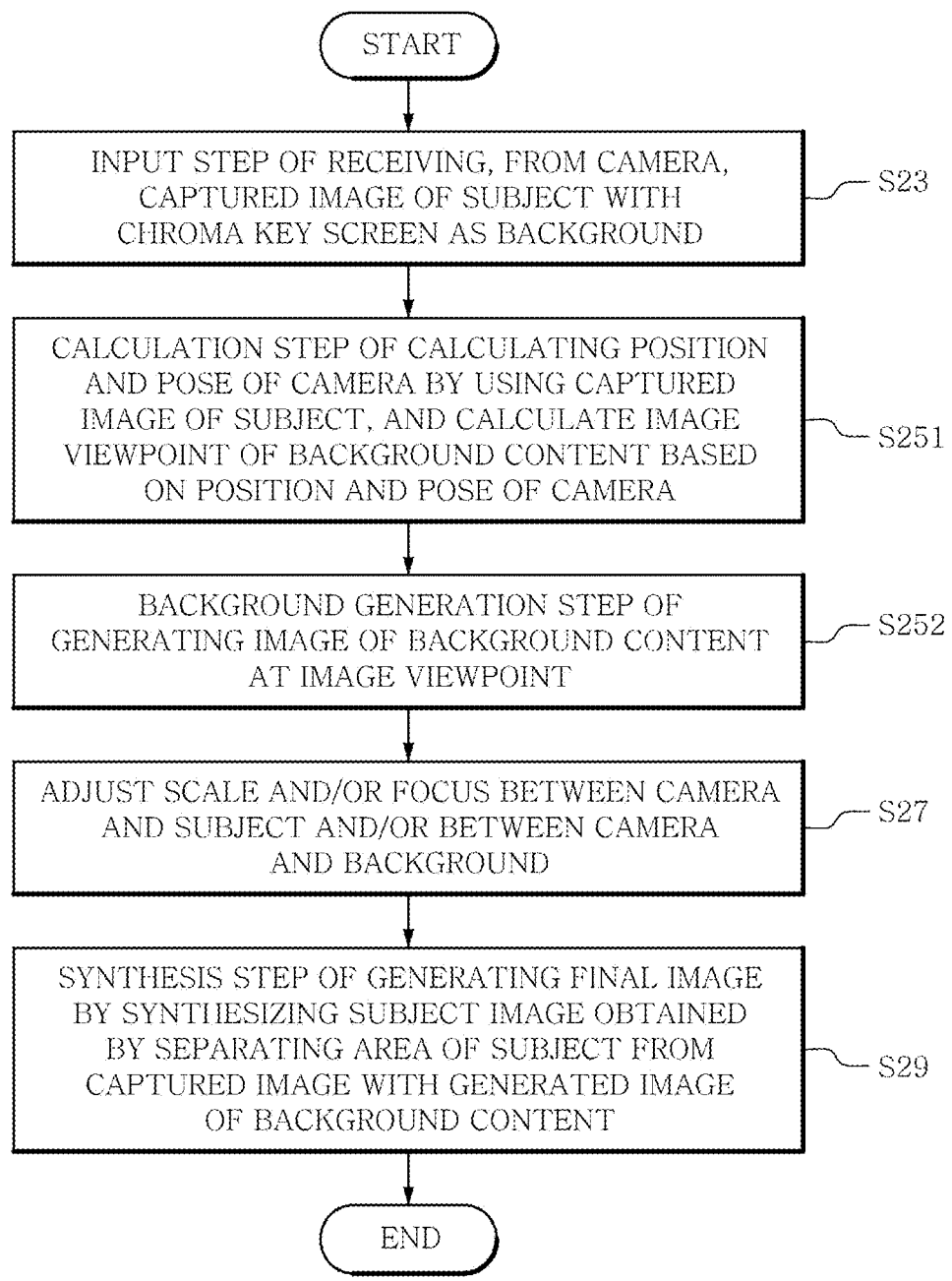
FIG. 10 is a flowchart illustrating a dynamic image capturing method using an arbitrary viewpoint image generation technology when a captured image has a chroma key screen as a background, according to another embodiment of the present disclosure.

FIG. 10 is a flowchart illustrating a dynamic image capturing method using an arbitrary viewpoint image generation technology when a captured image has a chroma key screen as a background, according to another embodiment of the present disclosure.

Referring to FIG. 10, the dynamic image capturing method may include an input step S23 of receiving, from a camera, a captured image of a subject with a chroma key screen as a background (e.g., by using the input unit 23).

Also, the dynamic image capturing method includes a control step S25 of generating background content by considering a relationship between the camera and the subject (e.g., by using the controller 25), and a synthesis step S27 of generating a final image by synthesizing a subject image obtained by separating an area of the subject from the captured image with an image of the generated background content (e.g., by using the synthesizer 27).

In an embodiment, the control step S25 may include a calculation step S251 of calculating a position and a pose of the camera by using the captured image of the subject (e.g., by using the calculator 251), and a background generation step S252 of generating an image of the background content at the image viewpoint (e.g., by using the background generator 252). As described in Embodiment 1, the image of the background content at the image viewpoint generated in the step S252 has a view matching to a view of seeing the background content at a viewpoint of the camera.

The input step S23, the control step S25, the calculation step S251, and the background generation step S252 of the dynamic image capturing method of Embodiment 2 respectively correspond to the input step S13, the control step S15, the calculation step S151, and the background generation step S152 of the dynamic image capturing method of Embodiment 1, and thus a detailed description thereof will be omitted.

Unlike in Embodiment 1, the dynamic image capturing method of Embodiment 2 further includes the synthesis step S27 of generating the final image by synthesizing the image of the background content at the calculated image viewpoint with the subject area in the captured image.

Referring back to FIGS. 5 and 6, the background generator 252 generates the image of background content having a view of seeing the background content implemented in a 3D virtual space from the viewpoint A, B, C, or D (S252).

The synthesizer 27 generates the final image by synthesizing the image of the background content with the image of the subject (S27).

Also, when the camera moves from a first viewpoint to a second viewpoint, the background generation step S252 may include generating an image of the background content corresponding to a change of the pre-stored background content from the first viewpoint to the second viewpoint. Then, the synthesizer 27 generates the final image obtained by synthesizing the image of the background content with the image of the subject at the same viewpoint, at each viewpoint (S27). That is, the synthesizer 27 generates the final image obtained by synthesizing a plurality of frames with the subject area according to the movement trajectory. The subject area synthesized with each of the plurality of frames is a subject area extracted from a captured image taken at an image viewpoint for each frame by the controller 25.

As shown in FIG. 5, a background frame at a viewpoint A is synthesized with a subject area captured at the viewpoint A. A background frame at a viewpoint B is synthesized with a subject area captured at the viewpoint B. Likewise, as shown in FIG. 6, a background frame at a viewpoint C is synthesized with a subject area captured at the viewpoint C. A background frame at a viewpoint D is synthesized with a subject area captured at the viewpoint D.

Also, when compared to the background generation step S152 of Embodiment 1, the background generation step S252 of Embodiment 2 includes generating the image of the background content at the image viewpoint calculated in the calculation step S251, and then adjusting a scale and/or a focus between the camera and the subject and/or between the subject and the background. Then, the synthesizer 27 generates the final image by synthesizing the image of the background content whose scale is adjusted with the subject area (S27).

Referring back to FIGS. 7 and 8, when the camera moves closer to the subject and the scale of the subject with respect to the camera increases, in response to the increase in the scale, the background generator 252 may generate an image E1-Background of background content at an image viewpoint having a scale between the subject and the background corresponding to the scale between the camera and the subject. Then, the synthesizer 27 generates a dynamic image E1-Final by synthesizing the image E1-Background of the background content with an area of the subject of the step S21 (S27).

Likewise, when the camera moves farther away from the subject and the scale of the subject with respect to the camera decreases, in response to the decrease in the scale, an image E2-Background of the background content at an image viewpoint having a scale between the subject and the background corresponding to the scale between the camera and the subject may be generated. The synthesizer 27 generates a dynamic image E2-Final by synthesizing the generated image E2-Background of the background content with the area of the subject of the step S21 (S27).

The dynamic image generation method may be implemented as an application or may be implemented as program instructions executable by various computer components and may be recorded on a computer-readable recording medium. The computer-readable recording medium may include program instructions, data files, data structures, and the like separately or in combinations.

The program instructions recorded on the computer-readable recording medium may be specially designed and configured for the present disclosure or may be well-known to and be usable by one of ordinary skill in the art of computer software.

Examples of the computer-readable recording medium include a magnetic medium such as a hard disk, a floppy disk, or a magnetic tape, an optical medium such as a compact disk read-only memory (CD-ROM) or a digital versatile disk (DVD), a magneto-optical medium such as a floptical disk, and a hardware device specially configured to store and execute program instructions such as a ROM, a random-access memory (RAM), or a flash memory.

Examples of the program instructions include advanced language codes that may be executed by a computer by using an interpreter or the like as well as machine language codes made by a compiler. The hardware device may be configured to operate as one or more software modules in order to perform the operation of the present disclosure, and vice versa.

While the present disclosure has been particularly shown and described with reference to exemplary embodiments thereof, they are provided for the purposes of illustration and it will be understood by one of ordinary skill in the art that various modifications and equivalent other embodiments may be made from the present disclosure. It should be understood that such modifications are included in the technical scope of the present disclosure. Accordingly, the true technical scope of the present disclosure is defined only by the accompanying claims.

What is claimed is:

1. A dynamic image capturing apparatus using an arbitrary viewpoint image generation technology, the dynamic image capturing apparatus comprising:
an input unit configured to receive, from a camera, a captured image of a subject with a background content display unit as a background; and
a controller configured to generate background content by considering a relationship between the camera and the subject,
wherein the controller comprises:
a calculator configured to calculate a position and a pose of the camera by using the captured image of the subject, and calculate an image viewpoint of the background content based on the position and the pose of the camera; and
a background generator configured to generate an image of the background content at the image viewpoint, wherein the image of the background content at the image viewpoint has a view matching to a view of seeing the background content at a viewpoint of the camera,
wherein the image of the background content at the image viewpoint is displayed on the background content display unit,
wherein the camera additionally captures an image of the subject with the image of the background content at the image viewpoint as a background.

2. The dynamic image capturing apparatus using an arbitrary viewpoint image generation technology according to claim 1, wherein the calculator is configured to calculate the position and the pose of the camera by using simultaneous localization and mapping (SLAM).

3. The dynamic image capturing apparatus using an arbitrary viewpoint image generation technology according to claim 1, wherein the background generator is configured to, when the camera moves, in response to adjustment of a scale or a focus between the camera and the subject according to the movement of the camera, generate the image of the background content at the image viewpoint having a scale or a focusing between the subject and the background corresponding to the scale or the focusing between the camera and the subject.

4. The dynamic image capturing apparatus using an arbitrary viewpoint image generation technology according to claim 1, wherein the camera is configured to obtain a 3D captured image based on at least one of focal plane information, depth information, and angle information, wherein the calculator is configured to calculate the position and the pose of the camera with respect to the subject based on the focal plane information, the depth information, and the angle information of the 3D captured image.

5. The dynamic image capturing apparatus using an arbitrary viewpoint image generation technology according to claim 1, wherein the controller is further configured to blur or more clearly refocus the background content according to a user's selection, in order to generate the image of the background content at the image viewpoint.

6. The dynamic image capturing apparatus using an arbitrary viewpoint image generation technology according to claim 1, wherein, when the camera moves from a first viewpoint to a second viewpoint, the calculator is configured to calculate an image viewpoint according to a movement trajectory of the camera, and the background generator is configured to generate an image of the background content at the image viewpoint according to the movement trajectory.

7. The dynamic image capturing apparatus using an arbitrary viewpoint image generation technology according to claim 1, further comprising a sensor configured to detect a movement of the camera, wherein the calculator is configured to calculate the position and the pose of the camera from a multi-viewpoint image input by using multi-viewpoint geometry.

8. A dynamic image capturing method using an arbitrary viewpoint image generation technology performed by a processor, the dynamic image capturing method comprising:

an input step of receiving, from a camera, a captured image of a subject with a background content display unit as a background;

a control step of generating background content by considering a relationship between the camera and the subject, wherein the control step comprises:

a calculation step of calculating a position and a pose of the camera by using the captured image of the subject and calculating an image viewpoint of the background content based on the position and the pose of the camera; and a background generation step of generating an image of the background content at the image viewpoint, wherein the image of the background content at the image viewpoint has a view matching to a view of seeing the background content at a viewpoint of the camera, wherein the image of the background content at the image viewpoint is displayed on the background content display unit, wherein the camera additionally captures an image of the subject with the image of the background content at the image viewpoint as a background.

9. The dynamic image capturing method using an arbitrary viewpoint image generation technology according to claim 8, wherein the calculation step comprises calculating the position and the pose of the camera by using simultaneous localization and mapping (SLAM).

10. The dynamic image capturing method using an arbitrary viewpoint image generation technology according to claim 8, wherein the background generation step comprises, when the camera moves, in response to adjustment of a scale or a focus between the camera and the subject according to the movement of the camera, generating the image of the background content at the image viewpoint having a scale or a focusing between the subject and the background corresponding to the scale or the focusing between the camera and the subject.

11. The dynamic image capturing method using an arbitrary viewpoint image generation technology according to claim 8, wherein the camera is configured to obtain a 3D captured image based on at least one of focal plane information, depth information, and angle information, wherein the calculation step comprises calculating the position and the pose of the camera with respect to the subject based on the focal plane information, the depth information, and the angle information of the 3D captured image.

12. The dynamic image capturing method using an arbitrary viewpoint image generation technology according to claim 8, wherein the control step comprises blurring or more clearly refocusing the background content according to a user's selection, in order to generate the image of the background content at the image viewpoint.

13. The dynamic image capturing method using an arbitrary viewpoint image generation technology according to claim 11, wherein, when the camera moves from a first viewpoint to a second viewpoint, the calculation step comprises calculating an image viewpoint according to a movement trajectory of the camera, and the background generation step comprises generating an image of the background content at the image viewpoint according to the movement trajectory.

14. The dynamic image capturing method using an arbitrary viewpoint image generation technology according to claim 8, wherein a sensor configured to detect a movement of the camera is further included, wherein the calculation step comprises calculating the position and the pose of the camera from a multi-viewpoint image input by using multi-viewpoint geometry.

15. A non-transitory computer-readable recording medium having embodied thereon a program for executing the dynamic image capturing method using the arbitrary viewpoint image generation technology according to claim 8.

16. A dynamic image capturing apparatus using an arbitrary viewpoint image generation technology, the dynamic image capturing apparatus comprising:

an input unit configured to receive, from a camera, a captured image of a subject with a chroma key screen as a background;

a controller configured to generate background content by considering a relationship between the camera and the subject; and a synthesizer configured to generate a final image by synthesizing a subject image obtained by separating an area of the subject from the captured image with an image of the generated background content, wherein the controller comprises:

a calculator configured to calculate a position and a pose of the camera by using the captured image of the subject, and calculate an image viewpoint of the background content based on the position and the pose of the camera; and a background generator configured to generate the image of the background content at the image viewpoint, wherein the image of the background content at the image viewpoint has a view matching to a view of seeing the background content at a viewpoint of the camera.

17. The dynamic image capturing apparatus using an arbitrary viewpoint image generation technology according to claim 16, wherein the background generator is configured to, when pre-stored background content is three-dimensional (3D) model, generate the image of the background content at the calculated image viewpoint by rendering with a view toward the background content at the calculated image viewpoint.

18. The dynamic image capturing apparatus using an arbitrary viewpoint image generation technology according to claim 17, wherein the synthesizer is configured to synthesize the rendered, changed background content with the separated subject image.

19. A dynamic image capturing method using an arbitrary viewpoint image generation technology performed by a processor, the dynamic image capturing method comprising:
  an input step of receiving, from a camera, a captured image of a subject with a chroma key screen as a background;
  a control step of generating background content by considering a relationship between the camera and the subject; and
  a synthesis step of generating a final image by synthesizing a subject image obtained by separating an area of the subject from the captured image with an image of the generated background content,
  wherein the control step comprises:
    a calculation step of calculating a position and a pose of the camera by using the captured image of the subject, and calculating an image viewpoint of the background content based on the position and the pose of the camera; and
    a background generation step of generating an image of the background content at the image viewpoint, wherein the image of the background content at the image viewpoint has a view matching to a view of seeing the background content at a viewpoint of the camera.

20. The dynamic image capturing method using an arbitrary viewpoint image generation technology according to claim 19, wherein the background generation step comprises, when pre-stored background content is a three-dimensional (3D) model, generating the image of the background content at the calculated image viewpoint by rendering with a view toward the background content at the calculated image viewpoint.

21. The dynamic image capturing method using an arbitrary viewpoint image generation technology according to claim 20, wherein the synthesis step comprises synthesizing the rendered, changed background content with the separated subject image.

22. A non-transitory computer-readable recording medium having embodied thereon a program for executing the dynamic image capturing method using the arbitrary viewpoint image generation technology according to claim 19.

* * * * *